US008434014B1

(12) United States Patent
Jaramillo (10) Patent No.: US 8,434,014 B1
(45) Date of Patent: Apr. 30, 2013

(54) SYSTEM AND METHOD FOR EDITING INFORMATION

(75) Inventor: Narciso Jaramillo, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1621 days.

(21) Appl. No.: 11/625,161

(22) Filed: Jan. 19, 2007

Related U.S. Application Data

(63) Continuation of application No. 09/991,759, filed on Nov. 23, 2001, now Pat. No. 7,191,405.

(60) Provisional application No. 60/252,798, filed on Nov. 22, 2000.

(51) Int. Cl.
*G06F 3/048* (2006.01)
*G06F 17/00* (2006.01)
*G06F 9/44* (2006.01)

(52) U.S. Cl.
USPC ............ 715/763; 715/234; 715/764; 717/113

(58) Field of Classification Search .................. 715/230, 715/231, 232, 234, 235, 255, 705, 708, 711, 715/760, 762, 763, 764, 780, 808, 810, 825, 715/967; 717/106, 109, 110, 113
See application file for complete search history.

(56) References Cited

U.S. PATENT DOCUMENTS

| | | | |
|---|---|---|---|
| 4,623,880 A | 11/1986 | Bresenham et al. | |
| 5,008,853 A * | 4/1991 | Bly et al. | 715/751 |
| 5,579,466 A | 11/1996 | Habib et al. | |
| 5,659,694 A * | 8/1997 | Bibayan | 715/788 |
| 5,664,113 A | 9/1997 | Worger et al. | |
| 5,664,208 A * | 9/1997 | Pavley et al. | 715/209 |
| 5,760,788 A * | 6/1998 | Chainini et al. | 345/474 |
| 5,835,919 A | 11/1998 | Stern et al. | |
| 5,845,299 A | 12/1998 | Arora et al. | |
| 5,937,417 A * | 8/1999 | Nielsen | 715/207 |
| 5,953,731 A * | 9/1999 | Glaser | 715/234 |
| 5,956,736 A * | 9/1999 | Hanson et al. | 715/234 |
| 5,966,532 A * | 10/1999 | McDonald et al. | 717/105 |
| 6,005,973 A | 12/1999 | Seybold et al. | |
| 6,052,130 A | 4/2000 | Bardon et al. | |
| 6,061,696 A | 5/2000 | Lee et al. | |
| 6,088,649 A | 7/2000 | Kadaba et al. | |
| 6,088,708 A | 7/2000 | Burch et al. | |
| 6,112,024 A * | 8/2000 | Almond et al. | 717/122 |
| 6,247,020 B1 * | 6/2001 | Minard | 1/1 |
| 6,268,851 B1 | 7/2001 | Bricklin et al. | |
| 6,275,829 B1 | 8/2001 | Angiulo et al. | |
| 6,433,800 B1 | 8/2002 | Holtz | |
| 6,493,733 B1 * | 12/2002 | Pollack et al. | 715/207 |
| 6,558,431 B1 | 5/2003 | Lynch et al. | |

(Continued)

OTHER PUBLICATIONS

Badros, Greg J., "Constraint Cascading Style Sheets for the Web", Proceedings of the 12th Annual ACM Symposium on User Interface Software and Tehcnology, Nov. 1999, pp. 7382.

(Continued)

*Primary Examiner* — Rashawn Tillery
(74) *Attorney, Agent, or Firm* — Schwegman Lundberg Woessner P.A.

(57) ABSTRACT

A system and method provides a pop up window containing a text editor to allow tags or attributes or other commands to be edited in accordance with a selected graphical object or a specified insertion point in a graphics editor.

33 Claims, 6 Drawing Sheets

U.S. PATENT DOCUMENTS

| | | | |
|---|---|---|---|
| 6,762,777 | B2 | 7/2004 | Carroll |
| 6,771,291 | B1 | 8/2004 | DiStefano, III |
| 6,792,595 | B1 * | 9/2004 | Storistenau et al. .......... 717/110 |
| 6,801,190 | B1 | 10/2004 | Robinson et al. |
| 7,117,433 | B1 * | 10/2006 | Glaser et al. .................. 715/205 |
| 7,370,315 | B1 * | 5/2008 | Lovell et al. .................. 717/100 |
| 2002/0023112 | A1 | 2/2002 | Avital |
| 2002/0069204 | A1 | 6/2002 | Kahn et al. |
| 2002/0118221 | A1 | 8/2002 | Hudson et al. |
| 2003/0023639 | A1 | 1/2003 | Chen et al. |
| 2003/0023641 | A1 | 1/2003 | Gorman et al. |
| 2003/0055970 | A1 | 3/2003 | Kourtidis |
| 2004/0019849 | A1 | 1/2004 | Weng et al. |
| 2004/0044966 | A1 | 3/2004 | Malone |
| 2004/0148576 | A1 | 7/2004 | Matveyenko et al. |
| 2004/0205488 | A1 | 10/2004 | Fry |
| 2004/0225672 | A1 | 11/2004 | Landers et al. |

OTHER PUBLICATIONS

Byrne, Michael D. et al., "The Tangled Web We Wove: A Taskonomy of WWW Use," Proceedings for the SIGCHI Conference on Human Factors in Computing Systems: The CHI Is the Limit, May 1999, pp. 544-551.

Carlson, Jeff et al., "Real World Adobe GoLive 4", 2000, Chapter 5, pp. 187-202, Peachpit Press, Berkeley, United States of America.

Castro, Elizabeth, "HTML 4 for the World Wide Web", 1998, Chapter 2, pp. 31-42, Peachpit Press, Berkeley, United States of America.

Conway, et al., "Automated Generation of Hypertextual Course Material From Plaintext", Proceedings of the 3rd Australasian Conference on Computer Science Education, Jul. 1998, pp. 76-84.

Hall, Gillian, et al., "NetObjects Fusion 2 for Windows and Macintosh", 1998, Chapter 6, pp. 71-84, Peachpit Press, Berkeley, United States of America.

Hester, Nolan, "Microsoft Frontpage for Windows 2002", 2002, Chapter 2, pp. 15-46, Peachpit Press, Berkeley, United States of America.

Towers, J. Tarin, "Dreamweaver for Windows and McIntosh", 2000, Chapter 4, pp. 51-73, Peachpit Press, Berkeley, United States of America.

Tyler, Denise, "Sams Teach Yourself Microsoft Frontpage 2000 in 21 Days," Aug. 1999, pp. 7-32, Sams Publishing, Indianapolis, United States of America.

\* cited by examiner

SYSTEM AND METHOD FOR EDITING INFORMATION

PRIORITY INFORMATION

This application is a continuation of and claims priority to U.S. application Ser. No. 09/991,759 filed on Nov. 23, 2001 now U.S. Pat. No. 7,191,405 that claims priority to U.S. Provisional Application Ser. No. 60/252,798, filed on Nov. 22, 2000. The disclosure of the prior applications are considered part of (and are incorporated by reference in) the disclosure of this application.

FIELD OF THE INVENTION

The present invention is related to computer software and more specifically to computer software for graphically editing information.

BACKGROUND OF THE INVENTION

Computers are frequently used to edit information. Two types of editors are frequently used to edit information. A graphics editor displays graphical objects and text and allows an author to edit the graphical information using a graphical user interface to indicate the desired effect of any change. By contrast, a text editor displays text, and an author may edit the text using text based commands. However, if text is used as source code for graphics, it can be desirable to use a graphics editor and a text editor.

Some application programs, such as the conventional Dreamweaver 2 program formerly commercially available from Macromedia Corporation of San Francisco, Calif. allow authors to edit graphical source code for one or more web pages using both a graphics editor and a text editor that are linked to one another.

The conventional Dreamweaver application program provides each editor using two separate windows that can be displayed simultaneously: a graphics window containing the graphics editor and a code window containing the code editor. The author may click on an object in the graphics window, and graphically manipulate it, for example, by moving it, or manipulate it using a graphical user interface including menus and dialog boxes to change attributes for the object. The author may also add new objects into the graphics window using the graphics editor. If the author desires, the author may move the mouse cursor to the code window, where the source code for the web page is displayed, and directly adjust the source code for the web page using a text editor. Such an arrangement allows an author to use the more intuitive graphical window and see results of edits instantly, while retaining the power and flexibility to adjust the code directly. As an author makes changes to the graphics window, the code window is automatically updated and vice versa.

While the dual window approach is superior to requiring an author to choose between graphically manipulating the web page or text editing the code and then using only one type of editor, it suffers from several drawbacks. First, to make the code and graphics windows sufficiently large enough to display enough information at one time, the windows may overlap each other on the author's display screen. Although parts of both windows may always be visible, the author may only be able to view one or the other window in its entirety. If the portion of the code window that corresponds to the graphics window currently being edited is hidden behind the graphics window, the author must move one or both windows to allow the author to view the portion of the code window corresponding to the portion of the graphics window being edited. Thus, the convenience of the approach can seem less than ideal.

Second, authors may find it cumbersome to move between the windows. To edit the source code for an object in the code window, the author must move the mouse over the code window and click into it. Furthermore, if the author wishes to edit the code in the code window for an object that is not yet selected in that window, the author must either select it in the graphics window (in which case the corresponding code is scrolled into the code window if it was not visible) and then move to the code window, or the author must locate the code in the code window and click the mouse cursor over it. Either approach is cumbersome.

Third, although the author is allowed to insert code directly into the code window, little help is provided to the author to instruct the author what tags or attributes would be proper at the location of the cursor.

What is needed is a method and system that can allow information to be edited both graphically and textually, provides a more intuitive approach than other methods, can help prevent errors in the code, and can assist an author with selecting proper code.

SUMMARY OF INVENTION

A system and method allows an author to command the system and method to display a text editor in a window near one or more objects selected using a graphics editor or an insertion point in a graphics editor and add, delete or alter a small amount of the source code corresponding to the objects selected or near the insertion point. The system and method operates in different modes of operation depending on the number and type of object or objects selected, though an author can select a different mode of operation. The system and method provides hints to the author if the author leaves the text editor unchanged for a period of time. The author can adjust the source code being edited.

DETAILED DESCRIPTION OF A PREFERRED EMBODIMENT

Figure 1:
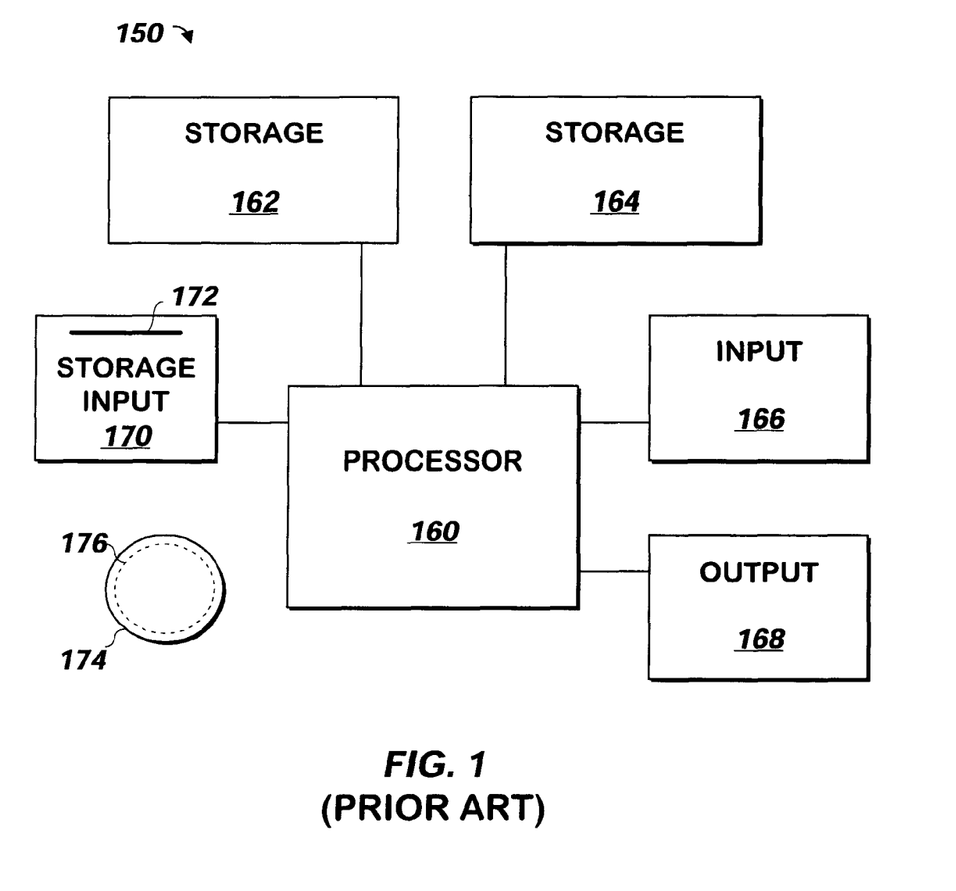
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows author input to the system 150. Output 168, such as a display or printer, allows the system to provide information such as instructions, data or other information to the author of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2A:
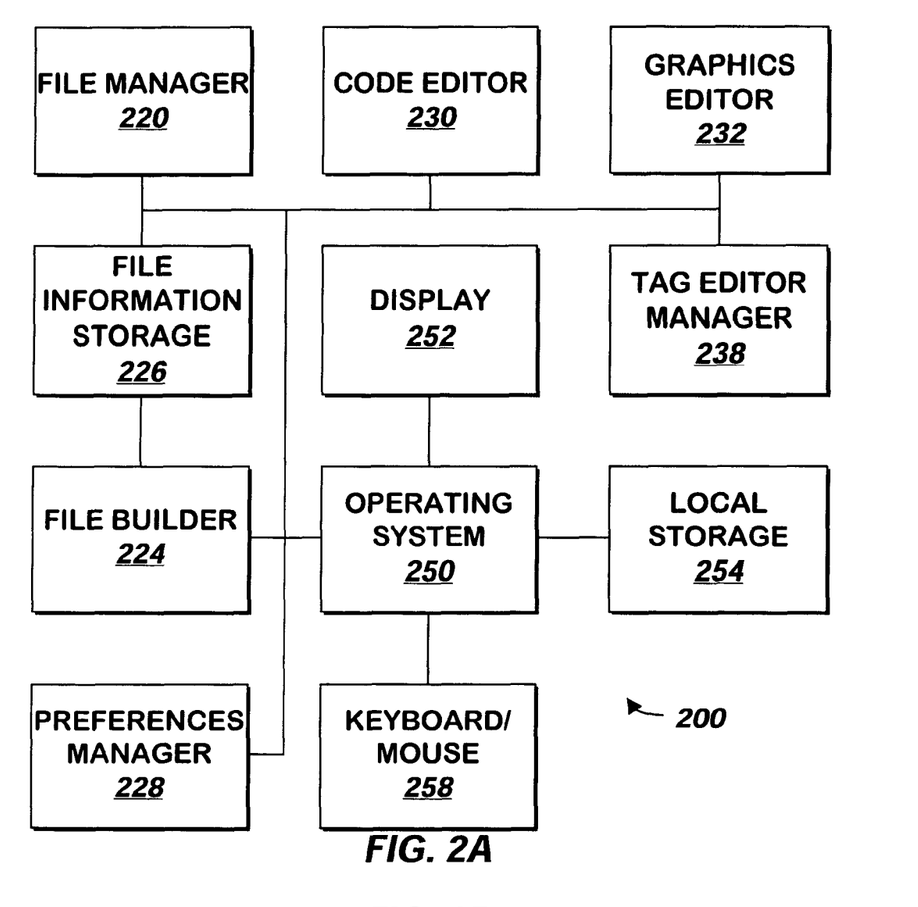
FIG. 2A is a block schematic diagram of a system for allowing an author to edit information according to one embodiment of the present invention.

Referring now to FIG. 2A, a system 200 for editing information is shown according to one embodiment of the present invention. Although the information described below is the source code for a web page, any type of information may be edited by the present invention. The information may be a portion or all of a file or any other collection of information. In one embodiment the system and method may be included as part of a web development computer application program, such as the conventional Dreamweaver product commercially available from Macromedia of San Francisco, Calif., or the conventional GoLive product commercially available from Adobe, Inc., of San Jose, Calif. Dreamweaver is described in Towers, *Dreamweaver for Windows and Macintosh* (Peachpit Press 2000, ISBN 0-201-70240-1), and GoLive is described in Carlson & Fleishman, *Real World Adobe GoLive* 4 (Peachpit Press 2000, ISBN 0-201-35474-8) and both of these books are hereby incorporated by reference in their entirety.

In one embodiment, all author input for system 200 is received by operating system 250 via a conventional user input device such as keyboard/mouse 258 which may be any conventional keyboard and mouse. User output is provided to display 252 which may be any conventional display such as a conventional computer monitor, via operating system 250.

File manager 220 receives from an author one or more commands to open or make a new file. The one or more commands may include a file name or other identifier of the file, which file manager 220 internally stores. If the one or more commands include one or more commands to open a file, file manager 220 opens the file from local storage 254, which may be any form of conventional storage such as memory or disk storage, (and need not be local, but may reside on a server anywhere) via operating system 250. If the one or more commands include one or more commands to create a new file, file manager 220 creates the file and stores the file in file information storage 226.

In one embodiment, the file opened by file manager contains the source code for graphical information such as a web page, and may include HTML tags. When the file is opened, file manager 220 stores the file in file information storage 226 using a hierarchical arrangement, such as a tree structure, as will now be described.

HTML is a tagged coding language and is described by Castro, HTML 4 for the world wide web (1998 Peachpit Press, ISBN 0-201-69696-7). Tags are used as commands to control formatting, cause the display of other files, create links to other files and control the operation of other functions. Some commands are represented by a start tag, but no end tag. Such tags include "IMG" tags. Other commands are represented by a start tag and an end tag, frequently to control the appearance of an element of the web page between the start and end tags. For example, the start tag, "<b>" turns on a bold function, and the start tag, "<i>" turns on an italics function. The end tag, "</b>" turns off the bold function and the end tag, "</i>" turns off the italics function. Text between the start tag and a corresponding end tag will be displayed by a browser according to the function of the tag. Thus, the code for a web page includes both tags and text, with some of the tags being able to control the display of the text.

Some tags or other types of commands are used to delineate sections of the file containing the source code. For example, HTML documents contain a header section having start and end tags of "<head>" and "</head>" respectively, and a body section having start and end tags of "<body>" and "</body>", respectively. Some tags allow one or more attributes to be specified, some of which may be optional. For example, to set the background color of a web page, the bgcolor attribute may be specified in the body tag with a value set to a code for the color in between double quotes. Thus, the body may be started with <body bgcolor="FFFFFF"> and ended with </body>.

The tags and text in the source code for a web page may be nested among tags. For example, a complete body may be "<body><b><i>Hello</i></b>World</body>". The nesting of tags provides a logical hierarchy. In the example body above, the hierarchy would include the body tag as a parent, the body tag descending therefrom, the italics tag descending from the body tag and the "Hello" text descending from the italics tag. The "World" text descends from the body tag. Thus, the above body may be arranged into a hierarchy represented by:

body
  bold
    italics
      "Hello".
  "World"

As described briefly above, file manager 220 opens the file or creates a new file according to commands received from the author. To open the file, if the file is an HTML file, file manager 220 parses the code and text in the file and builds in file information storage 226 objects having a hierarchy corresponding to the nested command and text in the file as described above. Each object in the hierarchy corresponds to a different start tag in the source code or to text in the source code. In one embodiment, all objects descend from a page object that does not correspond to a part of the HTML file. The HTML portion of the page descends from an HTML object. Thus, using the example above, a body object would descend from an HTML object, which would descend from the page object. Descending from the body object would first be a bold object and next would be a text object containing "World". Descending from the bold object would be an italics object and descending from the italics object would be a text object with the text "Hello".

Each object contains or implies a begin tag, any attribute names and values specified, and for tags that use them, an end tag, or the object contains text. Thus, the body object would contain or imply a "<body>" tag, a "</body>" tag, and if the "bgcolor="FFFFFF"" attribute and value had been specified, the body object would contain that attribute and value in addition to any others that may have been specified in the file. Objects may have other attributes used internally by the system as described below and such attributes may be initialized by file manager 220. File manager 220 sets up links between objects in the hierarchy, linking objects to objects descending from that object, and setting the order of the links to match the order in which the objects were arranged in the HTML file. In one embodiment, links are also provided from an object to its parent by file manager 220. Thus, file information storage 226 is arranged as a tree of objects. All of this information is stored in file information storage 226.

In one embodiment, file manager may open files that contain the objects arranged in the hierarchy instead of text arranged as an HTML file. The objects may include the internally used attributes of the objects and may include preference information and other information stored outside of the hierarchical arrangement of objects. This type of file allows the preservation of information that will not be part of the HTML file, such as preferences and internally-used attributes. In such case, file manager 220 copies the file from local storage 254 into file information storage 226. It is not necessary that file manager open any particular type of file, and thus file manager can open any number of types of files in any number of formats, even only one format such as HTML.

In one embodiment, as file manager 220 either copies or builds the tree of objects as described above, file manager 220 assigns a unique identifier to each object and stores the identifier as part of the object. If objects are added using any of the editors described below, the editor also assigns a unique identifier to the object and stores the identifier as part of the object. This allows reference to an object to be made using its identifier, although other techniques for referencing an object such as a set of handles to each object, may be used in other embodiments of the present invention.

If the author uses file manager 220 to open a new file, file manager 220 builds an initial hierarchy containing a page object, and two objects descending from the page object: a head object and a body object. A bgcolor attribute of the body object may be specified with a value of "FFFFFF" by file manager 220 to initialize the background color of the web page.

Once the file has been opened as described above, file manager 220 signals graphics editor 232 and code editor 230 to display the objects in file information storage 226. The author may then edit the objects in file information storage as described in more detail below and then save the file onto local storage 254.

An author may save the file in either the hierarchical object format or HTML format by requesting file manager 220 to store the file and either using the format of the file that was opened, if any, or specifying a different format. File manager 220 signals file builder 224. If the file is to be stored as a file containing objects, file builder 224 copies the information in file information storage 226 into the file in local storage 254 via operating system 250. If the file is to be stored as an HTML file, file builder 224 builds the file in local storage 254 by selecting the highest object in the hierarchy (the page object) selecting the first ordered link descending from the selected object, writing into local storage 254 the start tag and any attributes, or the text, from the object, then selecting the first unselected descendant object from the selected object and repeating the process until no unselected object descends from the selected object. At that point, file builder 224 writes into local storage 254 the end tag of the most recent selected object if any, and selects the parent object of the object and repeats the process described above until the tags and text corresponding to all of the objects have been written.

Before saving the file, file builder 224 may prompt the author for the filename of the file if the file was a new file or the author requests file manager 220 to save the file using a "save as" command.

When signaled by file manager 220, graphics editor 232 requests operating system 250 to open a graphics window in a portion of the display screen and renders the objects in object storage in a graphics window on a display 252 via operating system 250. Graphics editor 232 renders the objects in the tree of objects in file information storage 226 in the graphics window in a manner similar to the way a browser would render the HTML code corresponding to the objects in the tree. In one embodiment, as graphics editor 232 renders each object in file information storage 226, graphics editor 232 stores into the object in file information storage 226 an XY coordinate position the upper left hand corner of an imaginary box that surrounds the object on the display, and the X and Y dimensions of the box or the XY coordinates of the lower right hand corner of the imaginary box. The X and Y coordinates are measured from the upper left hand corner of the window containing the editor from which the objects are graphically represented by, and selected using, graphics editor 232. The imaginary box is a box that completely encloses the object when displayed on the display screen and may be the smallest such box or one that is nearly as small, subject to the limitation that all imaginary boxes displayed on a single row in the graphics window have a height equal to the tallest box in the row. Blank lines such as would be found at the second "<p>" in the sequence, "<p><p><p>" have an imaginary box with a zero width.

The coordinates of each imaginary box are compared with the coordinates of the mouse pointer when an author clicks the mouse to allow graphics editor 232 to identify the object an author wishes to select if the author clicks the mouse within the boundaries of the imaginary box. If the author clicks within an imaginary box of an object, the object is considered selected and graphics editor 232 highlights the object, such as by drawing a box around it with sizing blocks at the corners and middle of each line in the drawn box. Multiple objects may be selected by shift clicking several objects, and a selected object may be unselected by clicking it again, although in one embodiment, all objects selected must be contiguous in the order in which they appear in the HTML code, and selecting two objects will cause graphics editor 220 to select the contiguous objects between them as well. Multiple objects may also be selected, and therefore highlighted by using graphics editor 220 to draw an outline of a box around such objects by dragging the mouse. Graphics editor 232 compares the objects having their upper left hand corners (or their entire imaginary box) inside the outline and selects those that do. If the author clicks the mouse on an area of the display screen that is not inside of any imaginary box or near the edge of an imaginary box, an insertion point cursor is moved to correspond to the mouse cursor. The insertion point cursor is moved to the right of the imaginary box of the rightmost object having an imaginary box to the left of the mouse cursor, or if no such object exists, to the left of the imaginary box of the leftmost object having an imaginary box to the right of the mouse cursor. If the author clicks the mouse below all of the imaginary boxes, the insertion point cursor may be placed immediately below the left hand side of the lowest imaginary box that has a left side that is against the left margin.

When signaled by file manager 220, code editor 230 requests operating system 250 to open a code window on the display 252. Code editor 230 then traverses the nodes in the tree of objects in file information storage 226 in the same manner described above with respect to file builder 224 to build a set of code objects corresponding to the code, including the text, or the tags and attributes, of each object in the tree stored in file information storage 226, and displays the code objects in the code window. In one embodiment, each code object contains a link to, or identifier of, the object in file information storage 226 from which it was generated. Thus, the code objects displayed in the code window by code editor 230 illustrate the source code for the web page in the window or other area displayed by graphics editor 232. Thus, if the file opened by file manager 220 was an HTML file, the code objects displayed in the code window by code editor 230 will be the HTML source code for the objects displayed by graphics editor 232.

The author may then make a change to either the graphical representation of the web page provided by graphics editor 232 using a graphical user interface or the text representation of the source code of the web page provided by code editor 230 using a text-based editor. The graphical user interface may include dialog boxes, palettes, shortcuts, menus and the like provided by graphics editor 232. The text-based editor provided by code editor 230 includes menus and shortcuts provided by code editor 230. Some menus are shared by both editors 230, 232 and may be operated by whichever editor 230 or 232 has the focus at the time the menu is operated.

Each time a change is made via one of the editors 230, 232, that editor 230, 232 makes the corresponding adjustments to the objects stored in file information storage 226. This may be performed by the editor in which the author is working deleting one or more objects, altering one or more objects or adding a new one or more objects to file information storage 232 corresponding to the author's actions in the editor. Either at the time an object is added, deleted or modified using graphics editor 232 or at the time the code editor 230 loses focus, that editor 230, 232 signals the other editor 230 or 232 to update its objects using the objects in file information storage 226, and such other editor 230, 232 updates the objects in its window.

As described above, the author may use shortcut commands which are one or more keypresses used to provide a command to an application program. One such command is a command requesting a pop up text editor window corresponding to a selection made, or an insertion point specified, in the graphics window that allows the author to add, modify or delete certain objects in file information storage 226, where any object added, deleted or modified is based on the object or objects selected, or the insertion point specified, in the graphics window, and the location of any object added is based on an insertion point or on object selected in the graphics window. This pop up window is referred to herein as a tag editor.

The tag editor differs from the text editor provided by code editor 230 in that the code editor displays and allows the author to edit more than one tag or text from a fixed location on the screen. The tag editor, described more completely below, allows the author to edit a small number of tags, such as 1 tag, and appears at a location near the graphical display of object being modified, or an insertion point, in the graphics window instead of remaining at a fixed location like the code window. In one embodiment, the tag editor also differs from the text editor provided by code editor 230 in that it does not persist, but rather, disappears when the author has completed performing the editing of a certain region in the graphics window. If the author desires to edit a different region not adjacent to the original region using the tag editor, the tag editor is exited, the new region is defined using the graphics editor and the tag editor may be called again to edit the different region. In one embodiment, the graphics editor, code editor and tag editor are displayed simultaneously by system 200.

In one embodiment, the shortcut for such command is "control-T" on a machine using the Windows operating system and "command-T" on a system using a Macintosh operating system although other shortcuts can be used. Other means of initiating an action such as menu selections (described more completely below) and the like may also be used. If the author provides such a shortcut or otherwise indicates a request to initiate the tag editor while graphics editor 232 has the focus, graphics editor 232 signals tag editor manager 238 and provides a block of information, referred to herein as the selection block, to tag editor manager 238. The block of information includes a list of the identifiers of the objects that have been completely selected excluding the first and last object selected, and, a begin selection that contains an identifier of the first object selected and an identifier of the last object selected, even if the first and last objects are not completely selected. An object such as a text object is not completely selected if all of the text within the object has not been selected.

In one embodiment, if the begin and/or end selections correspond to objects not completely selected, the begin and/or end selections in the selection block each contain not only an identifier of an object in file information storage 226, but also the number of characters from the beginning of the text where the selection starts and ends, although other techniques for communicating selection points may be used.

If no object is selected, only one of the begin and end selections is used to identify the objects surrounding insertion point cursor in the graphics editor: the begin selection is the identifier of the object preceding the insertion point or the end selection is an identifier of the object following the insertion point, but no objects will be in the list of objects. Other methods of communicating the above-described information may also be used by the present invention.

Figure 2B:
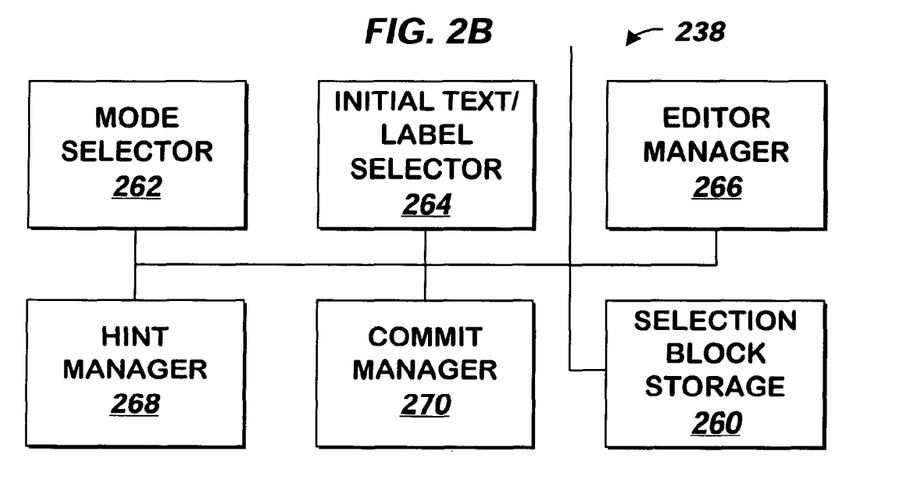
FIG. 2B is a block schematic diagram of a tag initial text/label selector of FIG. 2A according to one embodiment of the present invention.

Referring now to FIGS. 2A and 2B, tag editor manager 238 is shown in more detail according to one embodiment of the present invention. Mode selector 262 receives the selection block from graphics editor 232, and stores it into selection block storage 260.

Mode selector 262 uses the selection block to identify the mode in which the tag initial text/label selector 238 should operate. If the selection block indicates the mouse cursor was on an insertion point (e.g. no object was selected), mode selector 262 selects the "insert tag" mode. If the selection block indicates the selected objects correspond to a single tag (e.g. a single object and text or a single object), mode selector 262 selects the "edit tag" mode. Otherwise, mode selector 262 selects the mode as "wrap tag" mode or "edit tag" mode depending on whether it determines the selection is balanced as described below. If the selection is balanced, mode selector 262 selects the "wrap tag" mode. If the selection is not balanced, mode selector 262 balances the selection and selects the "edit tag" mode.

A selection is balanced if it contains, more than one object (even if the more than one objects are not completely selected) and the immediately preceding parent tag of the object corresponding to the begin selection and the object corresponding to the end selection is the same object.

If the selection block indicates that the selection is unbalanced, that is, the objects corresponding to the begin selection and end selection are different and descend directly from objects that are not the same object, mode selector 262 alters the selection block so that the selection is balanced. To make the selection balanced, mode selector identifies whether changing the end selection to be the end of the word that corresponds to the begin selection would make the selection balanced. If so, mode selector 262 performs this change in the begin selection, end selection or list and stores the result in the selection block in selection block storage 260, then selects the "edit tag" mode. If not, mode selector 262 adjusts the selection block to include the first object upwards in the hierarchy from which the object corresponding to the beginning selection and the object corresponding to the ending selection both descend, as well as all descendant objects of such object, performs this adjustment in any of the begin selection, end selection and list, and selects the "edit tag" mode.

At any time, an author may force a change in the mode selected by mode selector 262 using a shortcut. In one embodiment, this shortcut is the same shortcut that activated tag initial text/label selector as described above, although another shortcut may be used. If, while the tag editor window provided by tag initial text/label selector 238 or the graphics window provided by graphics editor 232 has focus, the shortcut is received, mode selector 262 receives the indication that the shortcut has been used, retrieves the selection block from selection block storage 260 and changes the mode to a mode based on what the mode was at the time the shortcut was pressed. If the mode is "edit tag" mode, mode selector 262 selects a new mode of "wrap tag". If the mode is "wrap tag", mode selector 262 selects a new mode of "insert tag". If the mode was "insert tag", mode selector 262 selects a new mode of "edit tag".

When mode selector completes selecting the mode, mode selector 262 stores the mode it identifies into the selection block in selection block storage 260 and signals initial text/label selector 264.

When signaled, initial text/label selector 264 uses the selection block in selection block storage 260 to build a label and initial text that will be displayed in a text box when the tag editor is displayed using the mode selected by mode selector 262. The label corresponds to the mode in the selection block. If the mode is "insert tag", initial text/label selector 264 builds a label "Insert tag:". If the mode is wrap tag, initial text/label selector 264 builds a label "Wrap tag:" If the mode is "edit mode", initial text/label selector builds a label "Edit tag:".

The initial tag text that the author will be allowed to edit is also determined by initial text/label selector 264. If the mode is "insert tag" or "wrap tag", initial text/label selector 264 identifies a blank initial tag text or initial tag text reading "< >".

If the mode is "edit tag", initial text/label selector 264 checks to see if the list of objects in the selection block contains one or more objects corresponding to code having a single tag. If so, the initial text/label selector 264 identifies initial text by building the source code for the object or objects in the selection block, including that tag, including any attributes. If not, initial text/label selector 264 identifies as the initial text the source code for the tag of the nearest parent object that is the parent of the object corresponding to the begin and end selection. If no object is selected, initial text/label selector 264 identifies the initial text by building the source code for the object preceding the mouse cursor in the graphics window as the initial text if the code contains a tag, and if not, initial text/label selector 264 identifies the initial text by building the source code for the most immediate ancestor object of that object whose code has a tag is identified as the initial text by initial text/label selector 264. In one embodiment, initial text/label selector 264 identifies the initial text so that it contains not more than one, or exactly one, tag. In one embodiment, initial text/label selector 264 identifies the initial text as described above without including any end tag or tags. In one embodiment, initial text/label selector 264 will only identify as the initial text the source code contained in a begin tag, omitting any source code following the begin tag.

Initial text/label selector 264 adds the label and initial text it identifies as described above to the selection block in selection block storage 260 and signals editor manager 266.

When signaled, editor manager 266 uses the selections in the selection block in selection block storage 260 to identify a location in which a text editor can be displayed that is above the selected object or objects indicated by the selection block. To do so, editor manager 266 retrieves the XY coordinates of the objects in the window drawn managed by graphics editor 232 corresponding to the objects in the selection block and identifies the lowest value of X and the lowest value of Y of all the coordinates it retrieves. If no objects were selected, the XY coordinates of the insertion point cursor in the graphics window are used instead. Editor manager 266 then subtracts from the value of Y a number of pixels equal to the height of the tag editor window it will display and uses the result as the Y value and uses the lowest X value as the coordinates of the upper left corner of a window in which to display a text editor, adjusting the Y and X values if necessary to accommodate physical limitations of display 252. If the objects are not displayed in the graphics window at the time the tag editor is called or the tag editor is otherwise prohibited from being displayed at the location identified by editor manager 266, editor manager identifies a location that is as close as possible to the identified location that does not overwrite any of the objects identified in the selection block and uses that location as the location it identifies.

Editor manager 266 directs operating system 250 to open such a window on display 252 and add a label from the selection block and a text box prefilled with the initial text from the selection block.

In one embodiment, editor manager 266 places a cursor in the text box at an initial location depending on the mode in the selection block. If the mode in the selection block stored in selection block storage 260 is "insert tag" or "wrap tag", editor manager 266 places the cursor after the "<" character.

In one embodiment, editor manager 266 selects certain text in the text box when the text box is displayed. For example, the left most attribute value may be selected and the selection indicated by highlighting it if the mode in the selection block stored in selection block storage 260 is "edit tag".

When editor manager 266 completes displaying the tag editor or redisplays it due to a change in mode, editor manager 266 signals hint manager 268. At such time, the author is allowed to alter the contents of the text box in the tag editor displayed by editor manager 266 or provide commands to alter the selection of text in the text box, change a text cursor in the text box change the mode as described above perform other commands as described below or commit the changes to file information storage 226.

The author may type into the text box to alter the text contained therein, under the control of editor manager 266. An author may use the arrow keys to move a text cursor in the text box or may use the mouse cursor to click into the text box, at which point editor manager 266 updates the text cursor in the text box to correspond to the location of the mouse cursor at the time it was clicked.

In one embodiment, editor manager 266 enforces a rule that an author cannot add a tag to the text box if at least one tag is in the text box. This may be accomplished by ignoring or refusing to enter into the text box a second "<" character in the text box of the tag editor and every character to the right of such a character. In another embodiment, the rule is enforced by commit manager 270 described below providing an indication of an error such as by displaying an error message and ignoring the text in the editor at such time as the change is attempted to be committed as described in more detail below. In one embodiment, the rule is "relaxed" in wrap tag mode or insert tag mode or both to allow an author to type an end tag, such as "<b></b>"

In one embodiment, hint manager 268 monitors the author's actions in the text box and provides hints describing possible entries to be made to tag names, attribute names and attribute values as will now be described. When called by editor manager 266, hint manager 268 retrieves from operating system 250 the text box cursor position and the text from the text box stores them into the selection block in selection block storage 260 and sets an operating system timer of between 0.5 and 2.5 seconds. When the timer elapses, hint manager 268 again retrieves from operating system 250 the text box cursor position and the text from the text box and the prior values from the selection block. If the text box cursor position or text box text has changed, hint manager 268 stores the new values of the position and text into the selection block and sets another timer in operating system 250. However, if the text box cursor position is at the same position as when the timer was set and the text in the text box is unchanged (e.g. the text box is "unchanged"), hint manager 268 uses the location of the cursor and the text in the text box to identify whether the cursor is at a location in the text box at which the author would add a tag name, an attribute name or an attribute value and if so, performs the functions described below. A tag name is added to the right of a "<" character and to the left of any space other than a space that follows the "<" character. An attribute name is added to the right of a space to the right of a tag name or an attribute value. An attribute value is added between double quotations. Other rules for these locations may also be used.

If the cursor is at a location in the text box at which a tag name is added when hint manager 268 determines the text box is unchanged, hint manager 268 retrieves a list of valid tag names from an internal storage location and displays it in a menu underneath the cursor. If the author selects one of the tag names it lists in the menu, hint manager 268 copies the tag name to a location to the right of the "<" symbol in the text box and resets the timer in operating system 250.

If the cursor is at a location in the text box at which an attribute name is added when hint manager 268 determines the text box is unchanged, hint manager 268, using the text retrieved from the text box, parses the tag name, and retrieves from an internally stored set of lists of valid attribute names indexed by the tag a list of valid attribute names for the tag name it parses. Hint manager 268 displays the list as a menu and if an author selects one of the entries in the list, hint manager 268 copies it to the location in the text box at which the attribute name is added that is nearest to the cursor, adds the text, '="' following the attribute name, places the text box cursor in between the double quotations and resets the timer in operating system 250.

If the cursor is at a location in the text box at which an attribute value is added when hint manager 268 determines the text box is unchanged, hint manager 268, using the text retrieved from the text box, parses the attribute name that is nearest to, and to the left of, the text cursor in the text box, and builds a list of valid attribute values by scanning the objects in file information storage 226 and storing the attribute value for any identical attribute from all of the objects into a list of attribute values. Hint manager 268 displays the list of attribute values as a menu and if an author selects one of the entries in the list, hint manager 268 copies it to the location in the text box at which the attribute value is added (i.e. between the double quotation at the location of the text cursor) that is nearest to the text box cursor.

In one embodiment, when any menu is provided by hint manager 268, if the author types using the keyboard, hint manager 268 receives the character pressed. If the first character pressed corresponds to a first letter of a menu item, the first such menu item is selected by hint manager 268. If the author presses another key, the first menu item having the first two letters corresponding to the two keys pressed will be selected by hint manager 268 and so on. If the author presses return while a menu item is so selected, that menu item is inserted at the cursor position in the text box, or if text is highlighted in the text box, that menu item will replace the text highlighted in the text box.

In one embodiment, the period of time used to determine whether to display the hint is configurable by the author, by specifying the period of time between 0.5 and 2.5 seconds to preferences manager 228, which stores the period of time in file information storage 226. Hint manager 268 reads the value from file information storage and uses it to determine the period of time it uses for the timers it sets in operating system 250.

In one embodiment, if the author presses the tab key, the nearest attribute name or value to the right of the cursor or selection in the text box is selected and highlighted by editor manager 266. If the author presses the shift and tab keys, the nearest attribute name or value, or the tag name, to the left of the cursor or selection in the text box is selected and highlighted by editor manager 266.

In one embodiment, an author may use a keyboard shortcut to adjust the selected objects. If the author uses the keyboard shortcut "Control-<" (i.e. the control key is held down when the "<" key is pressed), editor manager 266 adds the parent object corresponding to the tag displayed to the objects selected in the selection block (referred to as "expanding the selection") and signals initial text/label selector 264. Initial text/label selector 264 recomputes the initial tag text as described above and substitutes the initial text in place of the initial tag text in the selection block in selection block storage 260 and signals editor manager 266 to redisplay the tag editor as described above. If the author uses the keyboard shortcut "Control->" editor manager 266 removes the parent object selected using the prior control < from the selected objects (referred to as "contracting the selection") in the selection block in selection block storage 260 and signals initial text/ label selector 264. Initial text/label selector 264 recomputes the initial tag text as described above and substitutes the initial text in place of the initial tag text in the selection block in selection block storage 260 and signals editor manager 266 to redisplay the tag editor as described above.

In one embodiment, when editor manager 266 performs the selection of the parent object in response to the shortcut described above, it increments a counter that is initialized to zero by initial text/label selector 264 when the editor is first activated as described above. If the shortcut to remove the selected object is performed, editor manager 266 checks the counter. If the counter is zero or the initial value, editor manager 266 checks the contents of the text box. If the contents of the text box contains exactly one tag, initial text/label selector 264 selects the entire contents of the tag, and otherwise, ignores the command. If the counter is greater than zero, editor manager 266 contracts the selection as described above and decrements the counter.

In one embodiment, if an author makes a change to the text in the text box after expanding the selection, editor manager 266 sets a flag that it clears after each time it expands the selection. If the flag is set when the selection is contracted, initial text/label selector 264 ignores any command to contract the selection.

In one embodiment, after the author provides the command to expand or contract the selection, but before the selection is expanded or contracted as described above, editor manager 266 signals commit manager 270, which attempts to commit any changes as described below.

In one embodiment, changes made to a tag, or additions made, in the text box are committed as described below under certain circumstances and new tags inserted are committed under some of those circumstances. Committing a change has the effect of recording it into file information storage 226.

Changes made to attributes of a tag that existed before the tag editor was displayed made in edit mode are committed under one or more or all of the following conditions:

1. The author moves the text cursor in the text box from one attribute to another using the arrow keys.
2. The author presses the tab key.
3. The author clicks a region in the text box outside of the attribute name or attribute value changed.
4. The author expands or contracts the selection.
5. The author types a space, double quote or ">" symbol at the end of an attribute value.
6. The author presses the return key or clicks outside the text box.

When such a condition occurs, editor manager 266 is notified and notifies commit manager 270. To commit a change in edit mode, commit manager 270 substitutes the attributes of the tag in the text box for the attributes of the tag used to build the initial text. If the author has changed the tag name, commit manager 270 substitutes the new name of the tag for the old name. If the author has deleted the tag name and all attributes, commit manager deletes the object corresponding to the tag.

In one embodiment, the author may elect to have the conditions numbered 1-5 not commit the changes using a user interface provided by preferences manager 228. If the author indicates that the occurrence of such conditions should not cause changes to be committed, preference manager 228 stores the preference in file information storage 226. When commit manager 270 is called by tag editor manager 238 to commit a change as described herein, tag editor manager 238 identifies whether the command that initiated the commit action is of types numbered 1-5 or type numbered 6 of the numbered types listed above. If the type is type 1-5, commit manager 270 checks the preferences before it attempts to commit changes. If the preferences indicate that no such commit should take place, commit manager does not commit the change and otherwise, commit manager commits the change.

If a tag is being added in insert mode or wrap mode, when the author presses the return key or clicks outside of the text box or the author expands or contract the selection, editor manager 266 signals commit manager 270 to commit the changes. In the embodiment in which preferences control whether changes are committed, editor manager 266 signals commit manager that the change is a type 6 change that should be committed without regard to the preferences as described above.

To commit a change in wrap mode, commit manager 270 builds in file information storage 226 a new object corresponding to the tag in the text box and causes it to descend from the parent object of the selected objects in an order of descendant objects from such object that is immediately prior to the first object of the selected objects that descends from that parent, and then adjusts the links from that parent object to the selected objects to instead run from the new object to the selected objects. The new object contains the tag name, attribute names and values and any end tags. If a selected object is not completely selected as described above, and the list of objects does not include any objects from which that object descends, commit manager 270 splits each such object in two, leaving the object or objects corresponding to the portion not selected to descend from its parent, and treating the object corresponding to the portion selected as the begin or end selection as described above.

To commit a change in insert mode, commit manager 270 adds a new object to file information storage 226 corresponding to the text in the text box. If more than one object is in the list of selected objects in the selection block, commit manager 270 adds the new object descending from the lowest object in the hierarchy of objects in file information storage 226 from which all of the objects in the list of selected objects descend, in an order immediately in front of the first object that descends directly from that parent object. The new object contains the tag name, attribute names and values and any end tags. If the begin and end selections are not completely selected, correspond to a graphics editor insertion point in a text object and only one object is in the list of selected objects in the selection block, commit manager 270 splits in two the object corresponding to the begin and end selections at such corresponding graphics editor insertion point, descending them from their original parent and adds the new object descending from their parent in between the two objects that it splits.

In one embodiment, commit manager 270 first parses the text in the text box and will not commit changes under certain circumstances, such as if more than one tag is specified in the text box as described above. In another embodiment, commit manager 270 parses the text in the text box to ensure that it represents only one valid tag according to conventional HTML syntax rules. If the text in the text box does not represent exactly one valid tag, commit manager 270 displays an error message and does not commit the change.

In one embodiment, commit manager 270 will attempt to fix certain deficiencies in the text box it finds, and if the deficiency or deficiencies can be fixed, it fixes them in the text it receives from the text box and commits the fixed text as described above. Such deficiencies may include a missing "<" or ">", a missing end tag, a missing right quoted before the ">" and other errors where the intent of the author may be ascertained.

In one embodiment, an author may exit the tag editor using at least two commands. Pressing the return key causes editor manager 266 to signal commit manager 270 to commit any changes or additions as described herein. Commit manager 270 commits the change or addition if possible as described above and signals editor manager 266 that it has committed the change or addition. Editor manager 266 then instructs operating system 250 to destroy the window containing the tag editor and release the memory allocated to it.

Another command that may be used to exit the tag editor is the escape key. If the author presses the escape key, editor manager 266 instructs operating system 250 to destroy the window containing the tag editor. Any uncommitted changes are thus not committed if the author presses the escape key.

In one embodiment, graphics editor 232 may be used to receive menu commands from the author via keyboard/mouse 258 and operating system 250. Such commands may be used to start the tag editor instead of the shortcuts described above. In one embodiment, when the author pulls down a menu item that may be used to start the tag editor, graphics editor 232 builds a selection block and passes it to an internally accessible mode selector similar to mode selector 262 which selects the mode mode selector 262 would select and returns the mode to graphics editor 232.

Graphics editor 232 uses the mode to display a menu item corresponding to valid modes of the selection block. For example, if the author has not selected an object, one of the menu items built by graphics editor 232 would be "insert tag". If one or more objects that correspond to exactly one tag are selected, one of the menu items built by graphics editor would be "edit tag". The other rules described above may be used by graphics editor to select menu items. If the menu item is selected, graphics editor 232 passes the selection block to tag editor manager 238 as described above.

In one embodiment, various of the menu items are displayed corresponding to not only the mode corresponding to the selection block but also some or all of the modes that may be switched from that mode by the author: for example, as if the author had initiated the tag editor and then switched modes as described above. Graphics editor 232 adds to the selection block it provides the mode that corresponds to the menu item selected. When mode selector 262 receives the selection block with the mode filled in according to the menu item selected, it does not select the mode and instead passes the selection block to initial text/label selector 264 for use as described above.

Figure 3A:
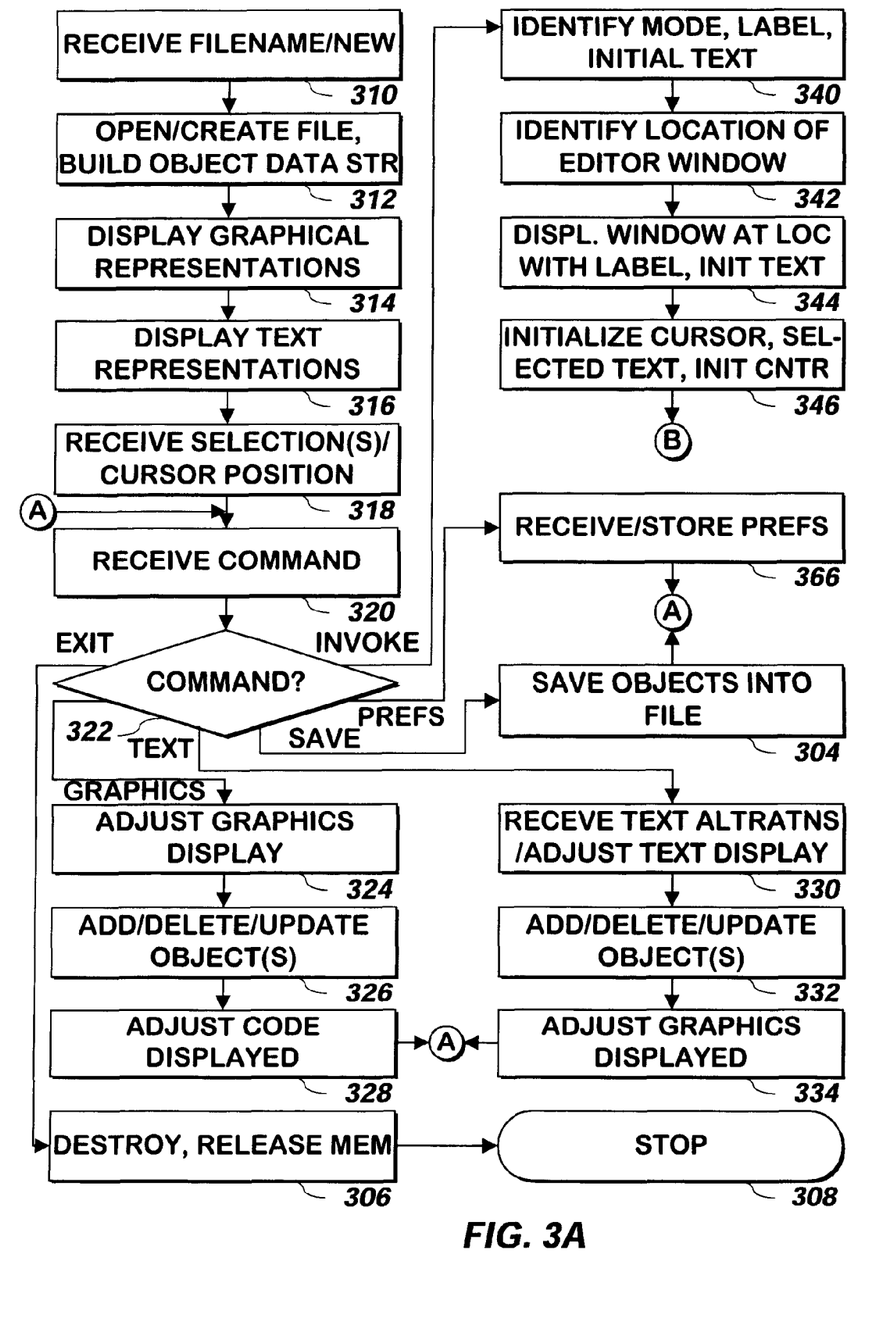
FIGS. 3A, 3B and 3C are a flow chart illustrating a method of editing information according to one embodiment of the present invention.
Figure 3B:
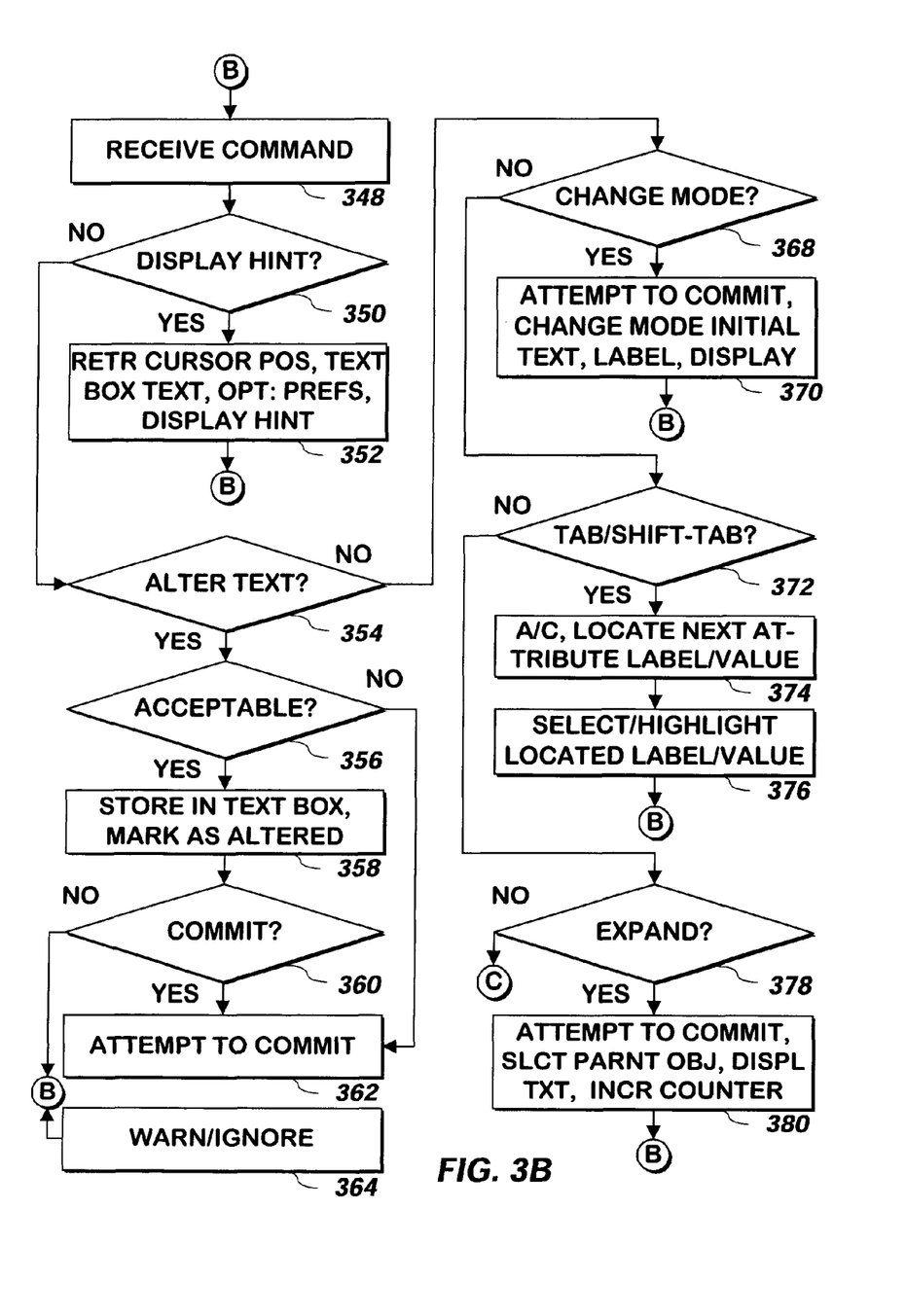
Figure 3C:
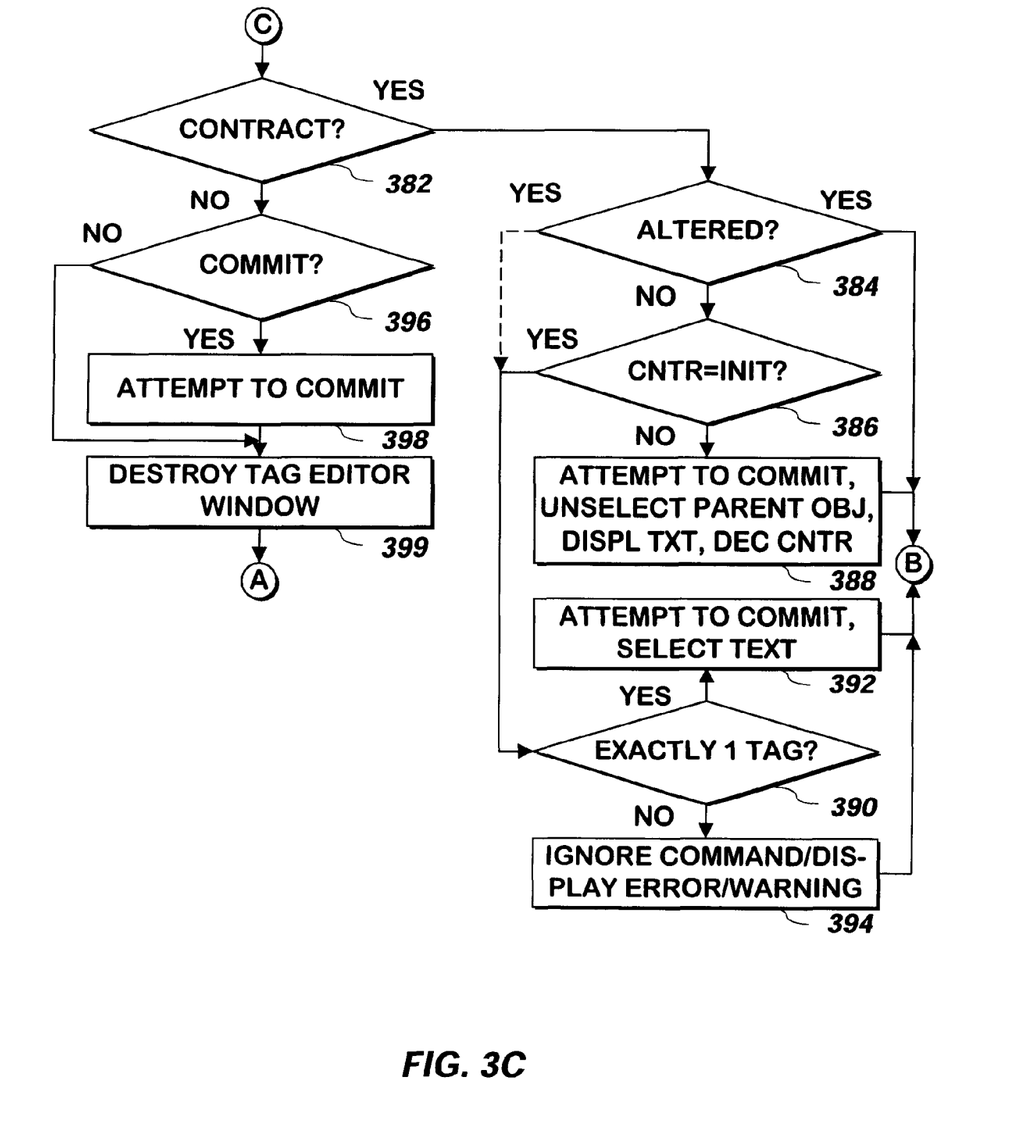

Referring now to FIGS. 3A, 3B and 3C a method of allowing an author to edit source code for content is shown according to one embodiment of the present invention. A command to open a file (and the filename) or start a new file is received 310 as described above. The file is opened and a data structure of hierarchical objects is built, either by copying it from the file or building it from the source code in the file, or the data structure for a new file is built and initialized as described above 312. Graphical representations of the source code are built and displayed 314 as described above. Text representations of the source code are built and displayed 316 as described above. A selection indicating some or all of one or more objects is optionally received or a command to place an insertion point corresponding to a mouse cursor click is optionally received 318, either in the graphical display produced in step 314 or the text display produced in step 316.

A command is received 320. If the command is a command to alter the graphical display 322, said command either being received graphically or via a command such as a menu, palette, shortcut or other command, the graphical display of objects is updated 324 according to the command received, one or more objects are added, deleted or the tag name or attributes of the object or objects corresponding to the command are updated 326, and the code for the object or objects corresponding to the command are updated 328 as described above, and the method continues at step 320.

If the command is a command to alter the text display 322, said command either being received via a text editor or via a command such as a menu, shortcut or other command, the text display of objects is updated 330 according to the command received, one or more objects are added, deleted or the tag name or attributes of the object or objects corresponding to the command are updated 332, and the displayed graphics corresponding to the object or objects are updated 334 as described above, and the method continues at step 320.

If the command is a command to invoke a tag editor 322 as described above, a mode, label and initial text are identified from one or more selected objects or an insertion point received in step 318 as described above 340. A location of an editor window is identified 342 using any selected objects or a cursor position as described above. A tag editor text window is displayed 344 at the location identified in step 342 using the label and initial text identified in step 340. A cursor may be placed and text may be selected within the tag editor window 346 as described above. In one embodiment, step 346 includes initializing a counter to zero or another initial value as described above.

A command is received 348. The command may be an explicit command such as a keypress or it may be implicit, such as leaving a text box cursor in the tag window over a tag name, attribute name or between double quotes around an attribute value for at least a small period of time as described above.

If the command is a command to display a hint 350 as described above, the cursor position and text box text are retrieved and used to display the hints as described above 352 and the method continues at step 348. Step 350 may be determined according to an author's preference as described above.

If the command is a command to alter the text or change the location of a text cursor in the tag editor window 354, the method continues at step 356 and otherwise 354, the method continues at step 368. At step 356, if any text as altered is acceptable, the text may be saved in the text box and the text box is marked as altered 358 as described above. If any such alteration or change of location of the text cursor implies a commit (e.g. because it is a quotation mark, space or ">") 360, an attempt is made to commit 362 the changes made to the text box as described above and below with respect to FIG. 4 and the method continues at step 348. Otherwise 356, a warning may be given, the alterations may be ignored or undone or any number of these may be performed 364 as described above and the method continues at step 348.

Figure 4:
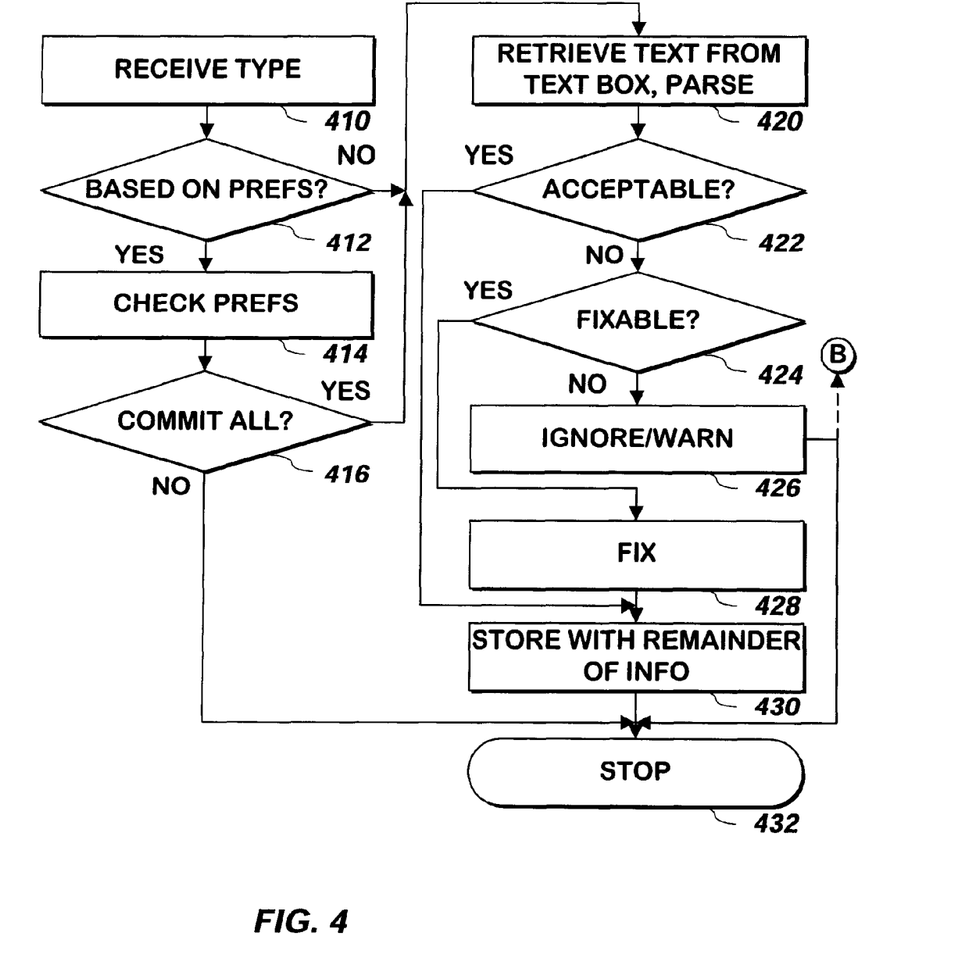
FIG. 4 is a flowchart illustrating a method of attempting to commit changes according to one embodiment of the present invention.

Referring momentarily to FIG. 4, a method of performing an attempt to commit changes is shown according to one embodiment of the present invention. A type of the change is received 410 as described above. If the type corresponds to a type that is committed based on the preferences of the user as described above 412, the method continues at step 414 and otherwise, the method continues at step 420. At step 414, the preferences are checked and if types 1-6 in the numbered list of types described above are to be committed 416, the method continues at step 420, and otherwise, the method of FIG. 4 terminates 432. After step 432, the method will continue at the point in FIG. 3 at which the attempt to commit was performed. The method of FIGS. 3A-3C does not terminate at step 432.

At step 420, text is received from a text box and optionally parsed. If the text in the text box is acceptable (e.g. it does not contain more than one tag and contains no fixable errors) 422, the method continues at step 424 and otherwise 422, the method continues at step 430. At step 424 if the unacceptable text is fixable as described above 424 (e.g. missing a ">", a "<" and ">" or missing a closing double quotes), the text retrieved is fixed as described above 428 and the method continues at step 430. At step 430, the text from the text box, with any fixes applied, is stored with the remainder of the information as described above and the method continues at step 432. If the text is not fixable 424, the command may be ignored and/or a warning may be provided 426 and the method may continue at step 432 in one embodiment and in another embodiment, the method continues at step 348 of FIG. 3B as indicated by the dashed line in the Figure. In one embodiment, steps 410-432 are only performed if the text in the text box is marked as altered.

Referring again to FIGS. 3A-3B, at step 368, if the command received in step 348 is a command to change the mode, an attempt is made to commit any changes as described above (including the steps of FIG. 4) the mode is changed and the initial text and label are changed and displayed 370 as described above and the method continues at step 348, and otherwise 368, the method continues at step 372.

At step 372, if the command received at step 348 is a tab or shift-tab command, an attempt is made to commit any changes as described above (including the steps of FIG. 4), and the "next" (e.g. one to the right if the command is tab and one to the left if the command is shift-tab) attribute or value displayed in the tag editor text box is located 374 and selected and highlighted 376 as described above and the method continues at step 348, and otherwise 368, the method continues at step 378.

At step 378, if the command received in step 348 was a command to expand the selection, an attempt is made to commit any changes as described above (including the steps of FIG. 4), the parent object of the objects selected is selected, the code corresponding to the selected objects is displayed, a counter is incremented or otherwise adjusted 380 and the method continues at step 348, and otherwise 378, the method continues at step 382.

At step 382, if the command received in step 348 was a command to contract the selection, if the text in the text box is marked as altered 384 as described above with respect to step 354, the method continues at step 348 in one embodiment. That is, the command is ignored, although in other embodiments (not shown in the Figure), a warning message is displayed and then the method continues at step 348 or 356. In another embodiment, if the text in the text box is marked as altered 384, the method continues at step 390 as indicated by the dashed lines in the Figure. If the text is not marked as altered 384, if the counter does not contain its initialized value 386, an attempt is made to commit any changes as described above (including the steps of FIG. 4), the highest level object in the selected objects, if any, is unselected, the code corresponding to the selected objects is redisplayed, the counter is adjusted in a manner opposite the adjustment of step 380 (for example, by decrementing it) 388 and the method continues at step 348. If the counter contains its initialized value 386, if the displayed text contains exactly one tag 390, the tag is selected 392 and the method continues at step 348, and otherwise 390 the command is ignored and optionally, an error or warning message is displayed 394 and the method continues at step 348 (or step 356 in another embodiment, or step 348 if preferences are set to not commit on such a condition or step 356 if preferences are set to commit on such a condition as described above).

If the command received in step 348 is a command to commit any alterations 396 and exit the tag editor, an attempt is made to commit any changes 398 as described above (including the steps of FIG. 4) and the method continues at step 399 and otherwise 396, the command is a command to exit the tag editor without committing any changes and so the method continues at step 399. At step 399, the tag editor window is destroyed, removing it from display, and the method continues at step 320.

If the command received in step 320 is a command to set preferences 322, preferences are received from the author and stored 366 and the method continues at step 320. Such preferences may include the amount of time the cursor is held before hints are provided or whether to commit changes under certain conditions as described above.

If the command received in step 320 is a command to save the file 322, the file is saved 304 using either of the formats described above and the method continues at step 320.

If the command received in step 320 is a command to exit 322, windows are destroyed and memory is released 306 and the method terminates 308.

What is claimed is:

1. A computer-implemented method comprising:
  displaying on a display screen a computer application program including a graphics editor and a first text-based editor to edit source code comprising a plurality of objects, one of the graphics editor and the first text-based editor responding to an object selection received in another one of the graphics editor and the first text-based editor;
  receiving inputs in the graphics editor, the inputs including an input being a selection of one or more objects from among the plurality of objects in the graphics editor and another input being an indication of an insertion point on a background of the graphics editor;
  identifying initial texts associated with the source code corresponding to the input being the selection and to the other input being the indication, respectively;
  generating, at locations on the display screen determined based on the respective inputs, instances of a pop-up text-based editor of the computer application program in response to the respective inputs in the graphics editor, the pop-up text-based editor having an input focus and being ready to receive edits to the source code, said generating the pop-up text-based editor causing the first text-based editor to become unresponsive to input in the graphics editor; and
  displaying the identified initial texts within the respective instances of the pop-up text-based editor.

2. The method of claim 1 further comprising:
  receiving an indication that edits to the source code included in an identified initial text, which is displayed in one of the instances of the pop-up text-based editor, have been completed;
  removing said one of the instances of the pop-up text-based editor from the display screen in response to said receiving the indication that the edits to the source code have been completed; and
  responsive to said removing said one of the instances of the pop-up text-based editor, updating the completed edits to the source code in the first text-based editor and reflecting an effect of the completed edits to the source code in the graphical editor,
  wherein said receiving the indication that the edits to the source code have been completed and said removing said one of the instances of the pop-up text-based editor are performed between said receiving the selection of one or more objects and said receiving the indication of the insertion.

3. The method of claim 1 further comprising displaying a menu that includes a plurality of words beneath a cursor position in any instance of the pop-up text-based editor when the cursor position has not changed for a predetermined period of time.

4. The method of claim 3 wherein the predetermined period of time is between 0.5 seconds and 2.5 seconds.

5. The method of claim 3 further comprising receiving at least one word from the plurality of words and displaying the received word in said any instance of the pop-up text-based editor.

6. The method of claim 3 further comprising determining the plurality of words based on the cursor position in said any instance of the pop-up text-based editor.

7. The method of claim 3 wherein the plurality of words comprises one of tag names, attribute names, and attribute values.

8. The method of claim 1 wherein any instance of the pop-up text-based editor operates in one of a plurality of modes of operation corresponding to the inputs in the graphics editor.

9. The method of claim 8 further comprising:
identifying a label corresponding to the mode of operation; and
displaying the identified label in said any instance of the pop-up text-based editor.

10. The method of claim 1 further comprising:
parsing an inserted text in any instance of the pop-up text-based editor based on syntax rules; and
altering the inserted text responsive to a syntax error.

11. The method of claim 1 wherein the source code comprises source code for a web page.

12. A computer-useable storage medium having computer readable program code embodied therein, the computer-useable storage medium comprising computer readable program code devices configured to cause a computer to:
display on a display screen a computer application program including a graphics editor and a first text-based editor to edit source code comprising a plurality of objects, wherein one of the graphics editor and the first text-based editor responds to an object selection received in another one of the graphics editor and the first text-based editor;
receive inputs in the graphics editor, the inputs including an input being a selection of one or more objects from among the plurality of objects in the graphics editor and another input being an indication of an insertion point on a background of the graphics editor;
identify initial texts associated with the source code corresponding to the input being the selection and to the other input being the indication, respectively;
generate, at locations on the display screen determined based on the respective inputs, instances of a pop-up text-based editor of the computer application program in response to the respective inputs in the graphics editor, the pop-up text-based editor having an input focus and being ready to receive edits to the source code, wherein the generation of the pop-up text-based editor causes the first text-based editor to become unresponsive to input in the graphics editor; and
display the identified initial texts within the respective instances of the pop-up text-based editor.

13. The computer-useable storage medium of claim 12 further comprising computer readable program code devices configured to cause a computer to:
receive an indication that the edits to the source code included in an identified initial text, which is displayed in an instance of the pop-up text-based editor, have been completed;
remove said one of the instances of the pop-up text-based editor from the display screen in response to said receiving the indication that the edits to the source code have been completed; and
responsive to the removal of said one of the instances of the pop-up text-based editor, update the completed edits to the source code in the first text-based editor and reflect an effect of the completed edits to the source code in the graphics editor,
wherein said receiving the indication that the edits to the source code have been completed and said removing said one of the instances of the pop-up text-based editor are performed between said receiving the selection of one or more objects and said receiving the indication of the insertion.

14. The computer-useable storage medium of claim 12 further comprising computer readable program code devices configured to cause a computer to display a menu that includes a plurality of words beneath a cursor position in any instance of the pop-up text-based editor when the cursor position has not changed for a predetermined period of time.

15. The computer-useable storage medium of claim 14 wherein the predetermined period of time is between 0.5 seconds and 2.5 seconds.

16. The computer-useable storage medium of claim 14 further comprising computer readable program code devices configured to cause a computer to receive at least one word from the plurality of words and display the received word in said any instance of the pop-up text-based editor.

17. The computer-useable storage medium of claim 14 further comprising determining the plurality of words based on the cursor position in said any instance of the pop-up text-based editor.

18. The computer-useable storage medium of claim 14 wherein the plurality of words comprises one of tag names, attribute names, and attribute values.

19. The computer-useable storage medium of claim 12 wherein any instance of the pop-up text-based editor operates in one of a plurality of modes of operation corresponding to the inputs in the graphics editor.

20. The computer-useable storage medium of claim 19 further comprising computer readable program code devices configured to cause a computer to:
identify a label corresponding to the mode of operation; and
display the identified label in said any instance of the pop-up text-based editor.

21. The computer-useable storage medium of claim 12 further comprising computer readable program code devices configured to cause a computer to:
parse an inserted text in any instance of the pop-up text-based editor based on syntax rules; and
alter the inserted text responsive to a syntax error.

22. The computer-useable storage medium of claim 12 wherein the source code comprises source code for a web page.

23. A system comprising:
a storage;
a display screen; and
a processor coupled with the storage and the display screen, and configured to execute a computer application program including:
a graphics editor and a first text-based editor to edit source code comprising a plurality of objects,
one of the graphics editor and the first text-based editor to respond to an object selection received in another one of the graphics editor and the first text-based editor,
the graphics editor additionally to receive inputs including an input being a selection of one or more objects from among the plurality of objects in the graphics editor and another input being an indication of an insertion point on a background of the graphics editor;

an initial text and label selector to identify initial texts associated with the source code corresponding to the input being the selection and to the other input being the indication, respectively;

a pop-up text-based editor to display the identified initial texts within respective instances of the pop-up text-based editor, at locations on the display screen determined based on the respective inputs, the instances of the pop-up text-editor generated in response to the respective inputs in the graphics editor, the pop-up text-based editor additionally having an input focus and being ready to receive edits to the source code; and the first text-based editor additionally to become unresponsive to input in the graphics editor responsive to the generation of the pop-up text-based editor.

24. The system of claim 23, wherein one of the instances of the pop-up text-based editor is removed from the display screen in response to receiving an indication that edits to the source code included in an identified initial text, which is displayed in said one of the instances of the pop-up text-based editor, have been completed, and wherein responsive to said removal of said one of the instances of the pop-up text-based editor, the first text-based editor updates the completed edits to the source code and the graphics editor reflects an effect of the completed edits to the source code, wherein said receiving the indication that the edits to the source code have been completed and said removal of said one of the instances of the pop-up text-based editor are performed between said receipt of the selection of one or more objects and said receipt of the indication of the insertion.

25. The system of claim 23, wherein the computer application program further comprises a hint manager to display a menu that includes a plurality of words beneath a cursor position in any instance of the pop-up text-based editor when the cursor position has not changed for a predetermined period of time.

26. The system of claim 25, wherein the predetermined period of time is between 0.5 seconds and 2.5 seconds.

27. The system of claim 25, wherein said any instance of the text-based editor receives at least one word from the plurality of words and displays the received word.

28. The system of claim 25, wherein the hint manager further to determine the plurality of words based on the cursor position in said any instance of the pop-up text-based editor.

29. The system of claim 25, wherein the plurality of words comprises one of tag names, attribute names, and attribute values.

30. The system of claim 23, wherein any instance of the pop-up text-based editor operates in one of a plurality of modes of operation corresponding to the inputs in the graphics editor.

31. The system of claim 30, where in the initial text and label selector is additionally to identify a label corresponding to the mode of operation and to display the identified label in said any instance of the pop-up text-based editor.

32. The system of claim 23, wherein the computer application program further comprises an editor manager to parse a syntax of an inserted text in any instance of the pop-up text-based editor based on syntax rules and altering the inserted text responsive to the editor manager identifying a syntax error.

33. The system of claim 23, wherein the source code comprises source code for a web page.

* * * * *

UNITED STATES PATENT AND TRADEMARK OFFICE
CERTIFICATE OF CORRECTION

| | |
|---|---|
| PATENT NO. | : 8,434,014 B1 |
| APPLICATION NO. | : 11/625161 |
| DATED | : April 30, 2013 |
| INVENTOR(S) | : Narciso Jaramillo |

It is certified that error appears in the above-identified patent and that said Letters Patent is hereby corrected as shown below:

In the Claims:

In column 22, line 22, in claim 31, delete "where in" and insert --wherein--, therefor Signed and Sealed this
Third Day of December, 2013

Margaret A. Focarino
*Commissioner for Patents of the United States Patent and Trademark Office*